(12) United States Patent
Glass et al.

(10) Patent No.: US 9,532,002 B2
(45) Date of Patent: Dec. 27, 2016

(54) SYSTEM FOR ENABLING MESHED CONFERENCES TO BE SEAMLESSLY PROMOTED TO FULL MCU BASED CONFERENCES

(71) Applicant: CafeX Communications Inc., Boston, MA (US)

(72) Inventors: Kevin Glass, Cardiff (GB); David Jodoin, Boston, MA (US); Kevin Wiseman, Cardiff (GB); Kris Hopkins, Boston, MA (US)

(73) Assignee: CafeX Communications Inc., Boston, MA (US)

( * ) Notice: Subject to any disclaimer, the term of this patent is extended or adjusted under 35 U.S.C. 154(b) by 0 days.

(21) Appl. No.: 14/661,664

(22) Filed: Mar. 18, 2015

(65) Prior Publication Data

US 2015/0271447 A1    Sep. 24, 2015

Related U.S. Application Data

(60) Provisional application No. 61/955,061, filed on Mar. 18, 2014.

(51) Int. Cl.
*H04N 7/15*    (2006.01)
*H04N 7/14*    (2006.01)

(52) U.S. Cl.
CPC .............. *H04N 7/152* (2013.01); *H04N 7/147* (2013.01)

(58) Field of Classification Search
CPC combination set(s) only.
See application file for complete search history.

(56) References Cited

U.S. PATENT DOCUMENTS

| 8,606,963 B2 | 12/2013 | Bachmann et al. |
| 8,625,589 B2 | 1/2014 | Chen et al. |
| 8,667,496 B2 | 3/2014 | Levin |
| 2002/0022551 A1 | 2/2002 | Watterson et al. |
| 2008/0002818 A1 | 1/2008 | Kashimoto |
| 2008/0137559 A1 | 6/2008 | Sasaki et al. |
| 2011/0187813 A1 | 8/2011 | Musgrave |
| 2012/0081506 A1 | 4/2012 | Marvit |
| 2012/0320146 A1 | 12/2012 | Civanlar et al. |
| 2013/0194378 A1 | 8/2013 | Brown |
| 2013/0222523 A1 | 8/2013 | Shanmukhadas et al. |
| 2014/0071223 A1 | 3/2014 | Chatterjee et al. |

OTHER PUBLICATIONS

International Search Report issued in connection with PCT/US15/21280.
Written Opinion of the International Searching Authority issued in connection with PCT/US15/21280.
International Search Report issued in connection with PCT/US15/24286.
Written Opinion of the International Searching Authority issued in connection with PCT/US15/24286.

*Primary Examiner* — Joseph J Nguyen
*Assistant Examiner* — Phung-Hoang J Nguyen
(74) *Attorney, Agent, or Firm* — Akerman LLP

(57) ABSTRACT

A method of conferencing participant video data and audio data includes switching from a mesh-based conference to an MCU-based conference upon the occurrence of a trigger event. The mesh-based conference includes transmitting separate video and audio data streams between endpoints, and the MCU-based conference includes transmitting single video/audio data from endpoints to an MCU and combined video/audio data streams from the MCU to the endpoints.

20 Claims, 7 Drawing Sheets

US 9,532,002 B2

SYSTEM FOR ENABLING MESHED CONFERENCES TO BE SEAMLESSLY PROMOTED TO FULL MCU BASED CONFERENCES

CROSS-REFERENCE TO RELATED APPLICATIONS

This application claims priority to U.S. Provisional Patent Application No. 61/955,061 filed on Mar. 18, 2014, the contents of which are hereby incorporated by reference in their entirety.

TECHNICAL FIELD

The present application is directed to videoconferencing. More specifically, the present application is directed to switching from mesh-based to MCU-based videoconferencing.

BACKGROUND

Videoconference services provide two-way conferencing between conference participants, e.g., between multiple conference participants that may be associated with different networks, endpoints, or remote locations. One videoconferencing technique is mesh-based videoconferencing wherein endpoints exchange data stream transmissions. Mesh-based videoconferencing requires significant network capabilities at participant endpoints, especially as the number of participants increases. Videoconferencing using a multi-connection unit (MCU) may be used to reduce local strain on participant endpoints by handling the bulk of the data processing, transmission, and reception. However, MCU-based videoconferencing merely reallocates the resource strain to the MCU service. Thus, as the number of participants and MCU videoconferences increase, the strain may affect the quality of the videoconference environment.

SUMMARY

In one aspect, a method of conferencing participant video data and audio data among a plurality of endpoints comprises transmitting from a first endpoint to at least a second endpoint in a mesh-based conference a first video data stream comprising first participant video data, and a first audio data stream comprising first participant audio data. The method may further include receiving at the first endpoint in the mesh-based conference at least a second video data stream comprising second participant video data transmitted by the second endpoint, and at least a second audio data stream comprising second participant audio data transmitted by the second endpoint. The method may further comprise switching, upon the occurrence of a trigger event, from the mesh-based conference to an MCU-based conference comprising transmitting from the first endpoint to an MCU a single video/audio data stream comprising first participant video data and first participant audio data, and receiving at the first endpoint from the MCU a combined single video/audio data stream comprising second participant video data and second participant audio data.

In another aspect a videoconferencing system for conferencing a plurality of conference endpoints comprises a first endpoint configured to conference one or more first endpoint participants with one or more second endpoint participants associated with at least one second endpoint. The first endpoint may be configured to switch the conference from a mesh-based conference to an MCU-based conference upon the occurrence of a trigger event. In the mesh-based conference the first endpoint may be configured to transmit first participant video data in a first video data stream and first participant audio data in a first audio data stream and receive second participant video data and second participant audio in separate second video and second audio data streams transmitted from the at least on second endpoint. In the MCU-based conference the first endpoint may be configured to transmit first participant video data and first participant audio data in a single video/audio stream to an MCU and receive a combined single video/audio data stream from the MCU comprising second participant video data and second participant audio data transmitted to the MCU by the at least one second endpoint.

In yet another aspect, a videoconferencing system comprises an intermediate component that includes a media forking module configured to act as an intelligent switch based on network capacity of a videoconferencing endpoint. The intermediate component is configured to fork a single videoconference audio/video data stream into a separate videoconference data stream and a separate videoconference audio data stream.

BRIEF DESCRIPTION OF THE DRAWINGS

The novel features of the described embodiments are set forth with particularity in the appended claims. The described embodiments, however, both as to organization and manner of operation, may be best understood by reference to the following description, taken in conjunction with the accompanying drawings in which:

DETAILED DESCRIPTION

Figure 1:
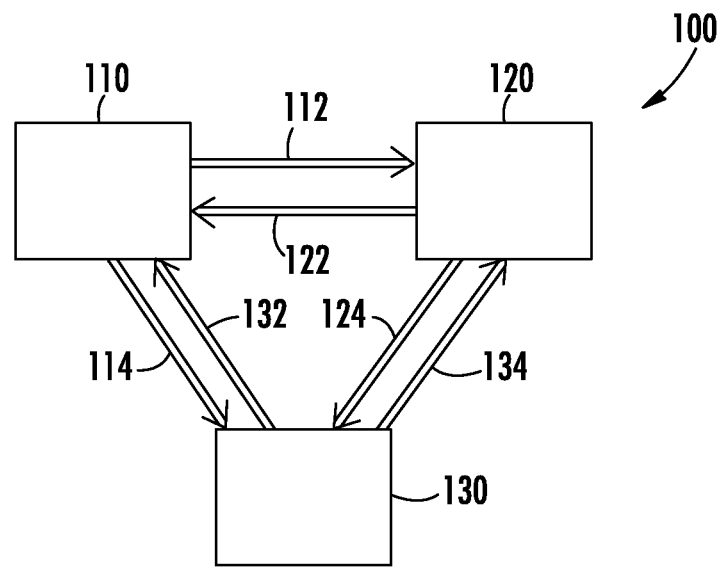
FIG. 1 is a schematic representation of a mesh-based videoconferencing technique according to various embodiments described herein.

A videoconference system may be configured to implement a videoconference service for support of end-to-end communications between participants within a videoconference environment, such as one or more networks through which participants may effectuate two-way communication using communication devices associated with respective endpoints of the videoconference.

Two-way communication generally refers to the ability of a participant to both transmit videoconference data to other participants as well as receive videoconference data transmissions from other participants. Two-way communication may include various exchanges of videoconference data comprising media data such as video, audio, text, graphical, etc. data streams. In some instances, such videoconference data may comprise two-way communication that includes exchange of various multi-media data streams between communications devices configured to communicate between endpoints across one or more networks.

In various embodiments, the videoconferencing system comprises an intermediary or conferencing service providing a connection or gateway between participant endpoints. In one embodiment, the intermediary may be configured to monitor or modify, e.g., with a conferencing service MCU, conferencing data streams. Monitoring may include assessment or sampling of the conferencing environment, e.g., hardware, software, networking components, latency, capacity, or consumption, associated with participant communication devices, endpoints, network, and intermediates. For example, monitoring may include end-to-end determination of the capabilities and operation of the components and communication environment associated with the videoconference.

Participants typically communicate with an endpoint via a client communication device, which may generally include one or more media functionalities such as recording, reproduction, display, and presentation functionalities. It will be appreciated that the various functionalities of these features may be modular, distributed, and/or integrated over one or more physical devices. Examples of client communication devices include devices associated with one or more of a microphone to record audio, a camera to record video, a speaker to play audio, and a display to display video, however, other media recorders and presenters may be used. In some instances, for example, client communication devices may include or be couplable with an integrated or peripheral device such as a touchscreen, mouse, keyboard may also be used for purposes of providing audio or video, e.g., text or graphic presentation, translation to sounds including text to speech, etc. Various client communication devices may include handheld devices, mobile or smart phones, PDAs, tablets, personal computers, monitors, cameras, speakers, projectors, phones, etc.

In one embodiment, a client communication device comprises or is configured to connect to videoconference system components configured to transmit and receive videoconference data, such as an endpoint. Transmission of videoconference data via the videoconference service may then be accomplished via transmission and receipt of videoconference data streams exchanged between two or more such endpoints. The videoconference data streams may be transmitted over public or private networks such as intranets, extranets, internets, satellite, cellular, wide-area, distributed, virtual or any other network through which videoconference data streams may be transmitted.

Endpoints may be configured to connect to videoconference system components such as networks and associated hardware, such as additional endpoints, multi-connection units (MCU), gateways, gatekeepers, routers, switches, or servers. Endpoints, videoconference system components, and associated networks may be hardware or software-based, may be associated with endpoints or intermediaries, as well as internally, locally, or externally hosted. As described herein, any endpoint, system component, or client device may comprise a storage medium or memory for storing data or instructions upon which an associated processor may use or execute to perform the operations or benefits herein described.

In various embodiments, endpoints include software and hardware such as codec, network connections or capabilities, multi-media connections or data ports, peripherals, mobile devices, computers, servers, routers, gateways, switches, hubs, etc. configured to effectuate the exchange, transmission, reception, and presentation of videoconference data, e.g., communications, as explained in more detail below. Endpoints may also include or be configured with encoding, compression, re-encoding, transcoding, transrating, transizing, or transmux functionalities. Endpoints may include logical or physical connections for various communication devices, such a speaker, microphone, display, keyboard, or other conferencing data ports. In one instance, an endpoint comprises a control module through which a participant may control aspects of a conference such as the exchange, transmission, reception, or presentation of the conferencing data. For example, an endpoint may comprise a user interface or connection configured to connect to a user interface such that a participant may control or monitor the conference. It is to be appreciated that unless stated otherwise, connections include wired or wireless connections and thus may include antennas, receivers, transmitters, transceivers, data ports and connectors configured for wired or wireless communication. Further, the system components described herein configured for various forms of communication may be configured or operable using any suitable protocol or programming.

In certain embodiments, client communication devices are configured for transmission and reception of transmissions originating or representative of transmissions from another participant, such as from another client communication device associated with the other participant. The transmissions may include videoconference data streams comprising media data, such as multi-media data, video data, audio data, etc. The videoconference data streams may also include other data such as metadata, network capability data or statistics such as capacity, consumption, latency, contention, or bandwidth that may comprise data descriptive of the videoconference environment, which may include status and operational aspects of the videoconference system, service, or components including network capabilities or compatibilities of endpoints and associated participants, e.g., number of participants, service load, type or level of service, transmission, reception, or processing statistics.

In one embodiment, client communication devices comprise a transceiver for transmitting and receiving transmissions comprising data streams sent over wired or wireless communication networks or mediums. For example, a communication device may comprise a wired network connection or an antenna configured for wireless communication. In some instances both wired and wireless communication may be used with respect to transmission or reception of videoconference data streams. In some instances, various intermediate or central components may monitor or modify videoconference data streams, e.g., may mix, separate, isolate, fork, or combine videoconference data streams.

In various embodiments, transmission of videoconference data streams may include any form or manner of transmission, e.g., analogue, digital, electrical, electromagnetic, telecommunications, wired, wireless, LAN/WAN, etc. or combinations thereof. As introduced above, in various embodiments, the videoconference system or service comprises a central or intermediate component. In some embodiments, the central or intermediate component is associated with an MCU videoconference service comprising an MCU. The MCU may comprise or be associated with a server having MCU functionality, e.g., an MCU module. The server, or another server in communication therewith, may include a controller. The controller may comprise a processor and a data storage medium configured to store instructions executable by the processor to control videoconference operations, e.g., promotion or demotion of videoconferences between mesh and MCU-based videoconferencing. In various embodiments, the instructions define fixed or dynamic rules based on one or more monitored videoconference parameters. In some embodiments, the controller is configured to receive or generate data comprising videoconference parameters from other system components, such as the MCU, endpoints, or associated networks and devices. The controller may also include monitoring capabilities with respect to monitoring videoconferencing parameters. Thus, the controller may monitor, receive, or generate data related to MCU operations, e.g., number of videoconferences, bandwidth, capacity, available or consumed resources, and load. The controller may also be configured to monitor, receive, or generate videoconferences during mesh-based videoconferencing. For example, the controller may monitor parameters including transmissions and operations for latency, bandwidth, consumption, or loss for example. Monitoring may also include receiving, requesting, determining, or generating, various capacity, capability, or configuration data related to endpoints or associated participant networks and devices.

In various embodiments, the intermediate components or described functionalities may comprise or be embodied in hardware or software including processors and storage mediums and may be configured to operate or be distributed within or among one or more servers, devices, or networks. Indeed, in some embodiments, an endpoint or associated client communication device comprises or may be configured to include one or more of the various intermediate component functionalities described herein. Participants and associated client communication devices may comprise or be part of the same or different networks and thus may connect to the videoconference service at the same or different endpoints. Intermediate components may be configured to receive, transmit, monitor, sample, modify, or route data streams between endpoints. In one embodiment, an intermediate component may comprise a module through which transmitted videoconference data streams between endpoints may pass during mesh-based conferencing. In one embodiment, the intermediate component includes a gateway configured to monitor the transmission of videoconference data streams transmitted between communication devices or endpoints. The gateway may comprise the controller and may comprise or be coupled to the server comprising the MCU functionality.

As introduced above, in various embodiments, the videoconference system includes intermediate components configured to monitor videoconference data streams. The videoconference data streams may be monitored collectively or independently. In one embodiment, an intermediate component comprises an endpoint or is otherwise integrated with or located internally or externally to a network endpoint whether located remotely or locally to the endpoint. In some embodiments, the videoconference system includes multiple intermediate components that may similarly collectively or independently monitor one or more of the videoconference data streams. Such intermediate components may be configured to communicate videoconference data to other components of the videoconference system obtained from the monitoring such as data descriptive of the videoconference environment, e.g., statistical data, network capabilities of the service or participant endpoints, metadata, raw or derived data.

In some embodiments, intermediate components such as a controller or associated function may communicate or apply videoconference data obtained or derived from various network capability parameters that may be sampled or monitored, which may include receiving network capabilities from endpoints, sampling, pinging, etc. to determine a fixed or dynamic threshold for initiating a switch between a mesh-based videoconference and an MCU-based videoconference. Such data may be descriptive of resources, capabilities, bandwidth, or other parameters with respect to one or more endpoints, participants, client communication devices, videoconference or services. In some embodiments, the parameters monitored and their analysis may be dynamically managed or assessed via rules and protocols, or controls and limits, that may relate to endpoint network capabilities, number of participants, MCU server or service load, client communication device capabilities, resource utilization, latency, consumption, capacity, available bandwidth, etc. In some instances, intermediate components may be configured to modify the data streams based on rules or protocols, including dynamic rules and protocols. The manner of modification may, in one embodiment, be in response to a determination obtained or at least partially derived from a sampled or monitored parameter and may include encoding, decoding, re-encoding, transizing, transcoding, transrating, transmuxing, unpacking, repackaging, mixing, isolating, redirecting or routing, or other modification of the videoconference data stream.

In one embodiment, the videoconference system is configured to implement a videoconference service comprising one or more first client communication devices connected to a first endpoint such as a router, gateway, or switch. Thus, videoconference participants may use communication devices to transmit and receive videoconference data within one or more data streams at the first endpoint. The first endpoint may be configured to transmit or receive the videoconference data streams to or from one or more additional client communication devices or endpoints. In some embodiments, the first endpoint is configured to transmit or receive the videoconference data streams to or from additional intermediate service components such as other endpoints or MCUs configured to transmit or receive the videoconference data streams to intermediate components, endpoints, or client communication devices. For example, videoconference data streams may be sent to multiple client communication devices from intermediate components. Thus, the videoconference service may include such transmissions using digital networks that connect endpoints.

In various embodiments, the videoconference system or service utilizes a meshing technique, e.g., wherein each endpoint in the conference streams data to every other endpoint in the conference, thereby providing highly scalable conferencing solutions to be built. The various features and benefits described herein may be better appreciated with reference to FIGS. 1-6 wherein similar elements are identified with similar numbers. FIG. 1 provides an overview of one meshing technique that may be incorporated into a conferencing system or method according to one embodiment. The videoconference 100 includes a first endpoint 110 configured to transmit first data streams 112, 114 to a second endpoint 120 and a third endpoint 130. The second endpoint 120 is configured to transmit a second data stream 122, 124 to each of the first endpoint 110 and the second endpoint 120. The third endpoint 130 is configured to transmit a third data stream to each of the first endpoint 110 and the second endpoint 120. Accordingly, the first endpoint is configured to receive the second data stream 122 and the third data stream 132, the second endpoint 120 is configured to receive the first data stream 112 and the third data stream 134, and the third endpoint is configured to receive the first data stream 114 and the second data stream 134.

As described above, each endpoint 110, 120, 130 may comprise or be configured to connect to a client communication device (not shown). The respective first, second, and third videoconference data streams 112, 114, 122, 124, 132, 134 may therefore comprise videoconference data representative of a participant communication, such as video data, audio data, text or graphics data, etc., transmitted from the client communication device. Each endpoint 110, 120, 130 may comprise a connection to one or more such client communication devices.

In various embodiments, during mesh-based videoconference service or operation, the respective first, second, and third video conferencing data streams 112, 114, 122, 124, 132, 134 may comprise additional videoconference data corresponding to various parameters of the videoconference environment, such as network capabilities, e.g., bandwidth, contention, latency, resource allocation and utilization, the number of participants or client communication devices through which the respective endpoint 110, 120, 130 connects to the videoconference, the type or level of service associated with one or more participants or the videoconference service. For example, an endpoint 110, 120, 130 may comprise an edge server or router associated with a private, virtual, wide-area, intranet, or extranet networks through which one or more participants connect to the videoconference service. Notably, while three endpoints 110, 120, 130 are illustrated, the number of endpoints 110, 120, 130 may be reduced or expanded. Indeed, the number of endpoints 110, 120, 130 at any given time may be subject to dynamically change as participants and associated client communication devices or endpoints 110, 120, 130 leave or join the videoconference.

The first videoconference data streams 112, 114 comprise data representative of first participant communications. Similarly, the second videoconference data streams 122, 124 and the third videoconference data streams 132, 134 comprise videoconference data representative of respective second participant and third participant communications. The videoconference data streams 112, 114, 122, 124, 132, 134 transmitted from a particular endpoint 110, 120, 130 are typically the same. However, in some embodiments, one or more of the data streams 112, 114, 122, 124, 132, 134 transmitted by an endpoint 110, 120, 130 may be modified by the endpoint 110, 120, 130 to, e.g., account for local network capabilities or network capabilities associated with the receiving endpoint 110, 120, 130. In one embodiment, an endpoint may be configured to modify a videoconference data stream 112, 114, 122, 124, 132, 134 for local transmission to associated client communication devices to account for local limitations with respect to local network capabilities or compatibilities, e.g., including operational, processing, or other hardware or software related limitations with respect to the local network or a connected external network or client communication device. According to various embodiments, modification of videoconference data at a transmitting or even receiving endpoint may be configured to address limitations in the communication medium, latency, queuing, processing, signal conversion, bandwidth consumption/capacity, compression or decompression of data, or various resources and utilizations contributing to the videoconference experience of the participant or other participants.

The videoconference data streams 112, 114, 122, 124, 132, 134 illustrated in FIG. 1 are depicted as double lines to indicate that the videoconference data streams include at least an audio data stream and a video data stream. However, it is to be appreciated that in this as in the other described embodiments the data streams, e.g., data streams 112, 114, 122, 124, 132, 134, may comprise other data, such as metadata, network capability data, IM/chat data, co-browsing data, file data or file transfer data, as well as other data combinations such as an audio stream, a video stream, both a video stream and an audio stream, or a single video/audio stream. In one embodiment, the endpoint 110, 120, 130 transmitting the data stream 112, 114, 122, 124, 132, 134 may monitor and or control the type of data, number of data streams, or combination of type and number of data streams in each data stream 112, 114, 122, 124, 132, 134 the endpoint 110, 120, 130 transmits. Thus, according to various embodiments, data streams 112, 114, 122, 124, 132, 134 112 may comprise an audio stream, a video stream, both a video stream and an audio stream, as well as a single video/audio stream. In some embodiments, one or more endpoints 110, 120, 130 may be configured to modify the type or number of data stream according to rules or protocols, which may include analysis or determination of endpoint network or client resources as described above or videoconference system or service resources, which may also include resources of other endpoints or clients associated with other participants.

Figure 2:
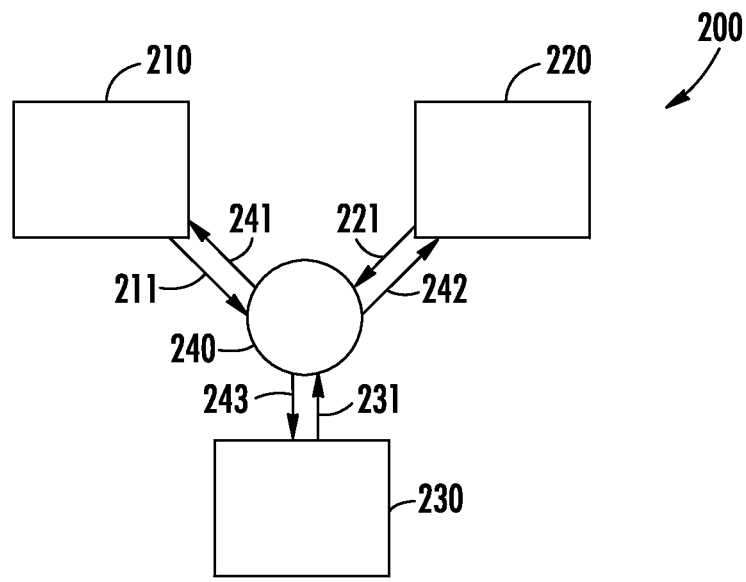
FIG. 2 is a schematic representation of an MCU-based videoconferencing technique according to various embodiments described herein.

Videoconference systems comprising services implementing a mesh technique, as depicted in FIG. 1, include scaling advantages over MCU-based videoconference systems by providing flexibility to grow with demand at reduced costs. As generally shown in FIG. 2, a videoconference system implementing an MCU-based videoconference service 200 may comprise a first endpoint 210 configured to transmit a first single videoconference data stream 211 representative of at least a first participant communication, a second endpoint 220 configured to transmit a second single videoconference data stream 221 representative of at least a second participant, and, as shown here, a third endpoint 230 configured to transmit a third single videoconference data stream 231 representative of at least a third participant. The videoconference system further includes an MCU 240 configured to receive the first, second, and third single videoconference data streams 211, 221, 231. The MCU 240 is configured to mix the single videoconference data streams 211, 221, 231 and transmit first, second, and third mixed single videoconference data streams 241, 242, 243 for reception at the first, second, and third endpoints 210, 220 230. In some embodiments, the single videoconference data streams 211, 221, 231 may have the videoconference data associated with the receiving endpoint 210, 220, 230 removed.

The MCU functions as a central resource and may limit performance of the videoconference service 200. For example, the capacity of the MCU and associated resources may be a limitation to the performance of the videoconference service 200 with respect to quality, number of conferences that may be held, or participants that join concurrently. Video processing performed by the MCU 240, for example, is resource intensive and generally requires extensive infrastructure such as expensive dedicated hardware or significant quantity of commodity servers to scale to large numbers of conferences or participants. Conversely, mesh-based videoconference service 100 tends to place higher network bandwidth requirements on each participant, endpoint 110, 120, 130, or associated network. To a large extent, in various embodiments, this may be offset by intelligently changing the video resolution sent by each participant or endpoint 110, 120, 130 to the other participants or endpoints 110, 120, 130 as the number of participants changes. As the number of participants increases, for example, the area available on a client communication device, e.g., display device, of a participant may be decreased to show all the other participants. Consequently, the video resolution of each videoconference video data stream 112, 114, 122, 124, 132, 134 may be reduced. This reduction also reduces the bandwidth consumed by each stream 112, 114, 122, 124, 132, 134 and offsets the increase in bandwidth consumed by the additional streams. The offset, however, tends to only be partial because, as the video resolution decreases, video codecs have less opportunity to compress the image while maintaining the same video quality. In other words, while lower video resolution may consume less bandwidth, in real terms, it will be proportionately more than that of higher video resolution.

In various embodiments, a videoconference system comprises a videoconference service configured for seamless transitioning between mesh-based conferencing, as generally shown in FIG. 1, and MCU-based videoconferencing, as generally shown in FIG. 2. For example, when a mesh-based videoconferences comprise large numbers of participants, videoconference performance may benefit by switching or transitioning to the use of MCU-based conferencing using MCU functionality, e.g., a server comprising MCU functionality through which videoconference data is transmitted, received, and compressed. The point at which the benefits of mesh-based videoconferencing may be offset by potential drawbacks that interfere with the performance of the videoconference, which may be at least partially improved by switching to MCU-based videoconferencing may vary according to the specifics of each deployed videoconference service and the capabilities or relative capabilities of each endpoint or each participant's endpoint. For example, network capabilities that may affect performance in mesh-based video conferencing include bandwidth, contention, and latency. Network or endpoint capabilities may further include compatibilities with respect to ability to produce a seamless switch between videoconferencing. For example, the controller may determine that a participant endpoint is unable to seamlessly display video content during the transition or may be unable to support MCU-based or mesh-based videoconferencing. Thus, the controller may retain the videoconference in the compatible videoconference. On the other hand, if participant endpoints in a videoconference are in an MCU-based videoconference and the controller receives a request to join the conference, the controller may determine that the endpoint associated with the request is unable to support MCU-based videoconferencing and therefore the controller may demote the videoconference to mesh-based in order to accept the request of the new participant to join the videoconference.

Figure 3A:
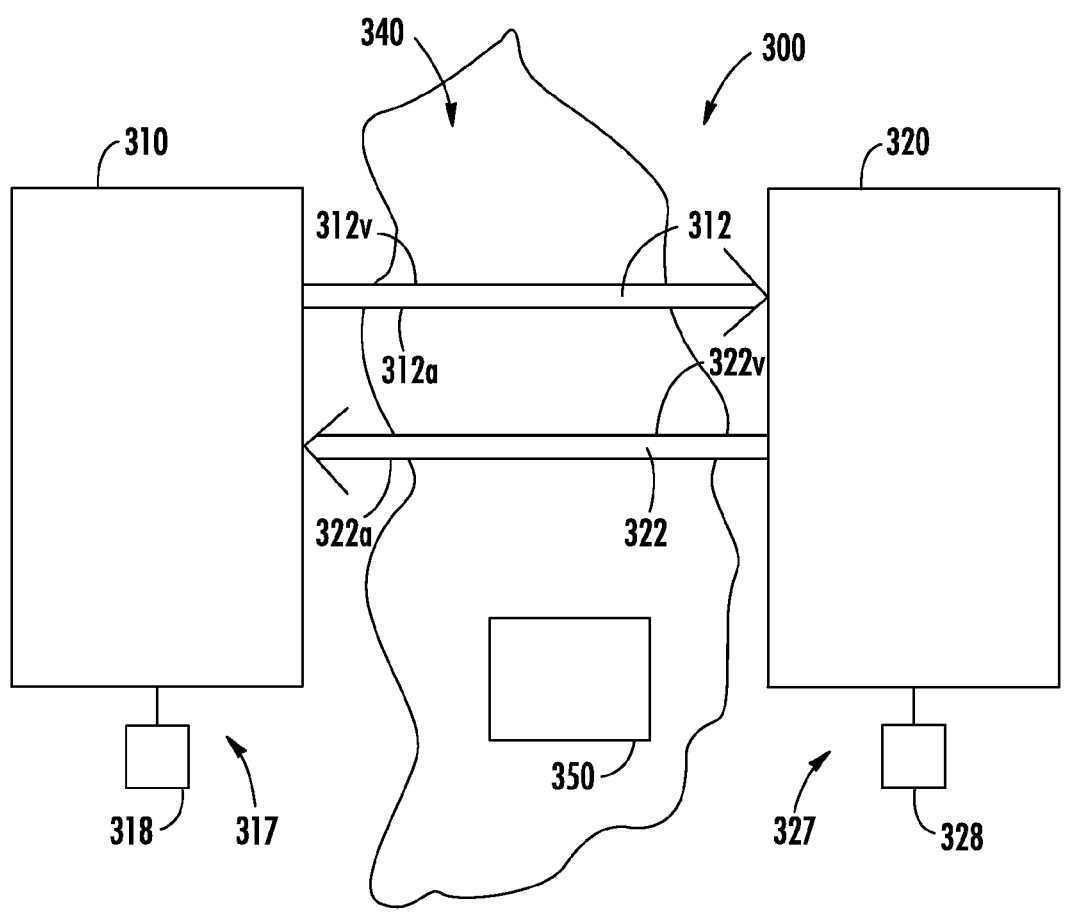
FIGS. 3A and 3B are schematic representations of a videoconference system for switching from mesh-based to MCU-based conferencing according to various embodiments described herein.

Referring to FIG. 3A, in one embodiment, a videoconference system 300 comprises a videoconferencing device 310 configured for use as a first endpoint of a videoconference. The first endpoint 310 may be associated with one or more videoconference participants 318 and be configured to transmit first participant video and audio data in a first videoconference data stream 312 comprising a first video data stream 312v and a first audio data stream 312a for transmission to a second endpoint 320 associated with one or more second participants 328 of a videoconference. The first endpoint 310 may be configured to receive a transmission of a second videoconference data stream 322 comprising second participant video and audio data in a second video data stream 322v and a second audio data stream 322a transmitted from the second endpoint 320. The videoconference system is configured to operate in an videoconference environment comprising a first endpoint network environment 317, a second endpoint network environment 327, and a central or intermediate network environment 340 through which the videoconference data streams 312, 322 are transmitted. An MCU 350 or functionality is associated with the central or intermediate network environment 340. The MCU 350 comprises MCU functionality and may include a network or server having MCU functionality. For example, the MCU 350 may comprise a server configured with a logic control module including a processor configured to execute instructions stored in a data storage medium associated with the server. Thus, in some embodiments, the MCU 350 may include a controller to control MCU 350 operations which may include receiving requests to switch videoconference configuration and initiating such switches when a trigger event threshold has been determined. Notably, in some embodiments, the MCU 350 or MCU functionality may be associated with one of the endpoints 310, 320.

Figure 3B:
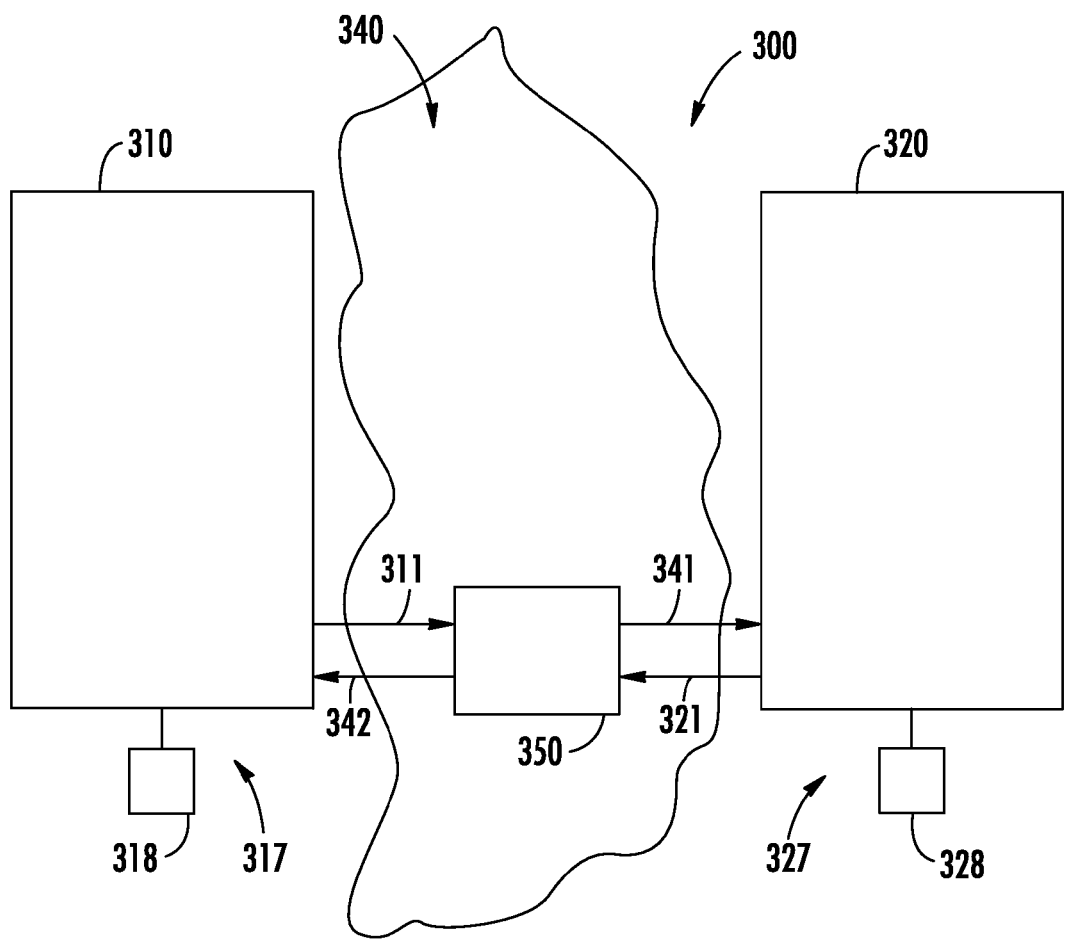

As illustrated in FIG. 3B, upon the occurrence of a threshold level or trigger event, the first endpoint 310 is configured to transmit first participant video and audio data in a first single video/audio data stream 311 to the MCU 350 and receive a combined or mixed video/audio data stream 342 from the MCU 350, wherein the combined video/audio data stream 342 comprises second video data and second audio data of one or more second participants transmitted by the second endpoint to the MCU 350. The MCU 350 is configured to receive the first single video/audio data stream 311 and transmit a combined or mixed video/audio data stream 341 comprising the first single video/audio data stream 311. The second video data and second audio data of the combined video/audio data stream 342 comprise a second single video/audio data stream 321 transmitted to the MCU 350 by the second endpoint 320. In embodiments where additional second endpoints (or third endpoints) are also conferencing with the first and second endpoints 310, 320, the first or second combined video/audio data stream 341, 342 may further comprise one or more third video data and audio data transmitted by one or more respective additional second endpoints via a third single video/audio data stream to the MCU 350. In at least one embodiment, the first or second combined video/audio data streams 341, 342 may also include the participant video and/or audio data of the receiving endpoint 310, 320 mixed or combined with the participant video and/or audio data of the participants associated with the other conference endpoints 310, 320. In one embodiment, the first and second combined video/audio data streams 341, 342 are the same with respect to combined participant video and audio data. Notably, videoconference data streams 322, 312, 311, 321, 341, and 342 comprising video and audio data of conference participants may comprise or be augmented with additional data streams or data such as metadata, network capability data, IM/chat data, co-browsing data, file data or file transfer data.

Figure 4A:
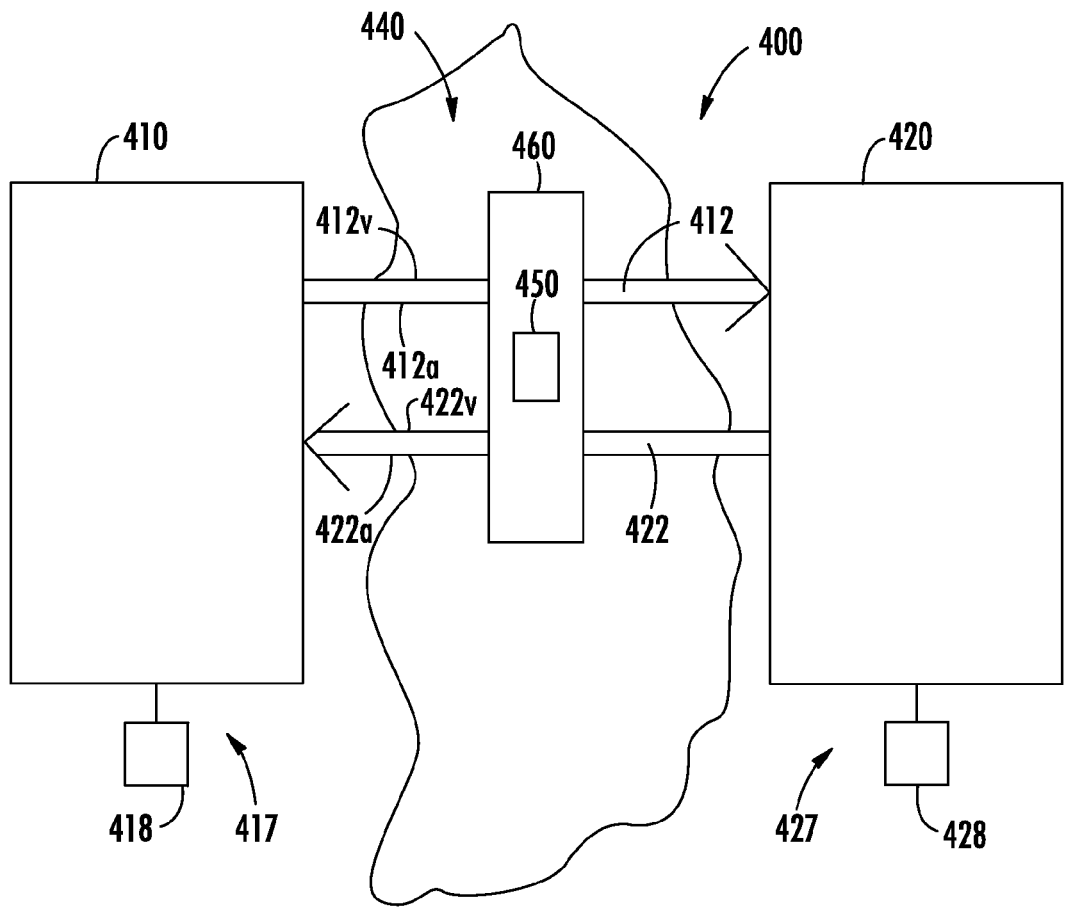
FIGS. 4A and 4B are schematic representations of a videoconference system for switching from mesh-based to MCU-based conferencing according to various embodiments described herein.
Figure 4B:
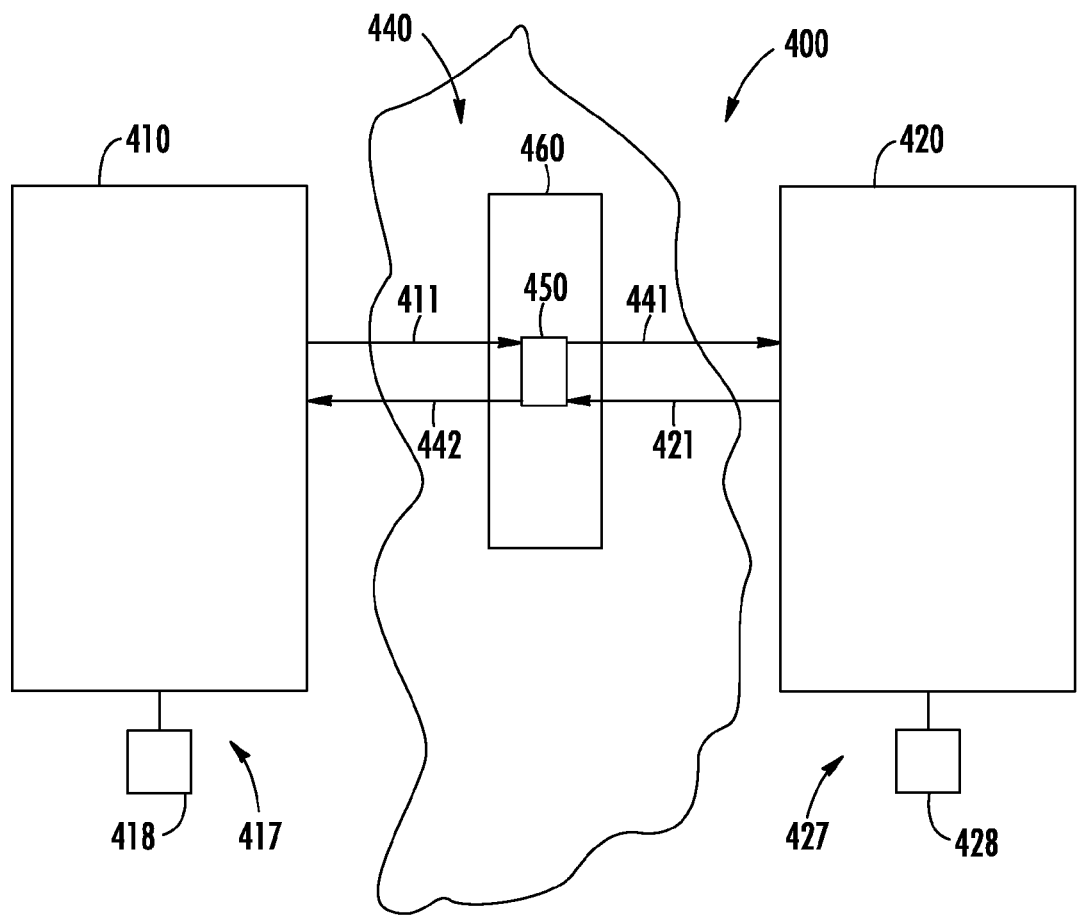

FIGS. 4A and 4B illustrate an embodiment of a videoconference system 400 configured to provide a videoconference service within a videoconference environment comprising at least one central or intermediate videoconferencing network environment 440 and at least two endpoint environments 417, 427 comprising at least a first and second endpoint 410, 420 and at least a first and second client communication device 418, 428. The central or intermediate network environment 440 may include one or more communication mediums or network environments, such as satellite, telecommunication, electromagnetic, electronic, wired, or wireless communication mediums or wide-area network, internet, virtual network, cloud, private network, distributed network, peer-to-peer or small world network, for example. The first endpoint environment 417 comprises the first endpoint 410 and, in some embodiments, one or more first endpoint networks including the at least one first client communication device 418 configured to be associated with at least one participant during operation of the videoconference service. The second endpoint environment 427 comprises the second endpoint 420 and, in some embodiments, one or more second endpoint networks including the at least one second client communication device 428 configured to be associated with at least one participant during operation of the videoconference service. In one embodiment, the first or second endpoint environments 417, 427 comprise a local, private, virtual, intranet, or extranet, e.g., a client communication device 418 comprising an extranet connection to a private network comprising the first endpoint 410.

The first endpoint 410 is configured transmit the first videoconference data stream 412 comprising video and audio data of first videoconference participants in at least one first video data stream 412v and at least one first audio data stream 412a to the second endpoint 420. The first endpoint 410 is configured to transmit the videoconference data stream 412 through the central or intermediate videoconference environment 440 to an intermediate component 460. The second endpoint 420 is configured transmit the second videoconference data stream 422 comprising video and audio data of second videoconference participants in at least one second video data stream 422v and at least one second audio data stream 422a to the first endpoint 410. The second endpoint 420 is configured to transmit the videoconference data stream 422 through the central or intermediate videoconference environment 440 to the intermediate component 460.

The intermediate component 460 may comprise a gateway coupled with an MCU functionality (or MCU 450), such as an MCU server or service, as described above. In some embodiments, the first or second endpoints 410, 420 may comprise a router, gateway, switch, hub, or server, for example. For brevity, only two endpoints 410, 420 are illustrated, it is however to be appreciated that additional endpoints may be included such that additional endpoints and associated participants may participate in the videoconference service. Additionally, in some embodiments, videoconference data streams 411, 412, 421, 422, 441, 442 comprising video and audio data of conference participants may comprise or be augmented with additional other data or data streams, such as metadata, network capability data, IM/chat data, co-browsing data, file data or file transfer data, as well as other data combinations such as an audio stream, a video stream, both a video stream and an audio stream, or a single video/audio stream. As described above, the system 400 further includes a central or intermediate videoconference environment 440 through which the data streams 412, 422 are transmitted.

The central or intermediate videoconference environment 440 in the illustrated embodiment includes the intermediate component 460. The intermediate component 460 is configured to monitor the data transmissions 412, 422. Data transmission 412, 422 are shown passing through the intermediate component, it should be understood, however, that one or more endpoints 410, 420 may transmit monitoring data such as videoconference parameters, e.g., participants, data loads, network capabilities of end points, participants, and resources, in a separate data stream to the intermediate component 460 and transmit at least the respective participant video data 412v, 422v and audio data 412a, 422a portions of the streams 412, 422 participating conference endpoints 410, 420. The intermediate component 460 may comprise a controller, e.g., a server, configured to monitor the videoconferencing environment and execute instructions or apply rules thereto to effectuate desired utilization or optimization of MCU resources. According to various embodiment, the controller may comprise a server configured to control or monitor various MCU functions. The controller may also monitor endpoints 410, 420 as well as associated network capacities of participants or control endpoint 410, 420 access to the MCU 450. The controller may, for example, comprise a gateway to the MCU 450, either of which may comprise the same or different networks. In one embodiment, the controller monitors videoconference parameters such as number of participants, duration, participants having reduced or suppressed data, number videoconferences, MCU load, network capacities.

The controller of the intermediate component 460 may include a storage medium or memory configured to store instructions or rules and a processor configured to execute the instructions or apply the rules to the monitored parameters or data generated therefrom. For example, as described above, the instructions may define dynamic rules based on videoconference parameters such as MCU load. The rules may therefore be applied at various levels according to a monitored operation of the MCU 450. If the controller determines that a threshold has been met, the controller may promote a mesh-based videoconference as depicted in FIG. 4A to an MCU-based videoconference as depicted in FIG. 4B. As described above with respect to FIGS. 3A and 3B, upon the occurrence of a threshold level or trigger event, the first endpoint 410 is configured to transmit first participant video and audio data in a first single video/audio data stream 411 to the MCU 450 and receive a combined or mixed video/audio data stream 442 from the MCU 450, wherein the combined video/audio data stream 442 comprises second video data and second audio data of one or more second participants transmitted by the second endpoint to the MCU 450. The MCU 450 is configured to receive the first single video/audio data stream 411 and transmit a combined or mixed video/audio data stream 441 comprising the first single video/audio data stream 411. The second video data and second audio data of the combined video/audio data stream 442 comprise a second single video/audio data stream 421 transmitted to the MCU 450 by the second endpoint 420. In embodiments where additional second endpoints (or third endpoints) are also conferencing with the first and second endpoints 410, 420, the first or second combined video/audio data stream 441, 442 may further comprise one or more third video data and audio data transmitted by one or more respective additional second endpoints via a third single video/audio data stream to the MCU 450. In at least one embodiment, the first or second combined video/audio data streams 441, 442 may also include the participant video and/or audio data of the receiving endpoint 410, 420 mixed or combined with the participant video and/or audio data of the participants associated with the other conference endpoints 410, 420. In one embodiment, the first and second combined video/audio data streams 441, 442 are the same with respect to combined participant video and audio data. Notably, videoconference data streams 422, 412, 411, 421, 441, and 442 comprising video and audio data of conference participants may comprise or be augmented with additional data streams or data such as metadata, network capability data, IM/chat data, co-browsing data, file data or file transfer data. The promotion may be seamless, e.g., from the perspective of the user, because the switch may incorporate or simulate the videoconference presentation and display layout of the prior mesh-based conference.

While switching between mesh-based and MCU-based videoconferencing has been generally described herein with respect to promotion from mesh-based to MCU-based videoconferencing, the system may further include demotion from MCU-based videoconferencing to mesh-based conferencing. In various embodiments, the determination for promotion and demotion consider the same parameters such as MCU load, endpoint network capabilities or compatibilities. For example, during an MCU-based videoconference, the controller may determine that a trigger event parameter such as the number of participants has been reduced or reduced to below a fixed or dynamic threshold. The controller may then demote the videoconference to mesh-based. As above, the endpoints may be configured such that the switch is seamless. In some instances, the determination may consider the endpoint capabilities. For example, the controller may determine the all the remaining endpoints comprise mesh-based capabilities or compatible mesh-based capabilities prior to demoting the videoconference. In one embodiment, application of rules to demote, or promote, comprise a time factor. For example, just prior to the end of a videoconference, the number of participants may drop. Thus, the controller may delay demotion to mesh-based videoconferencing for a fixed or dynamically determined period of time.

Figure 5:
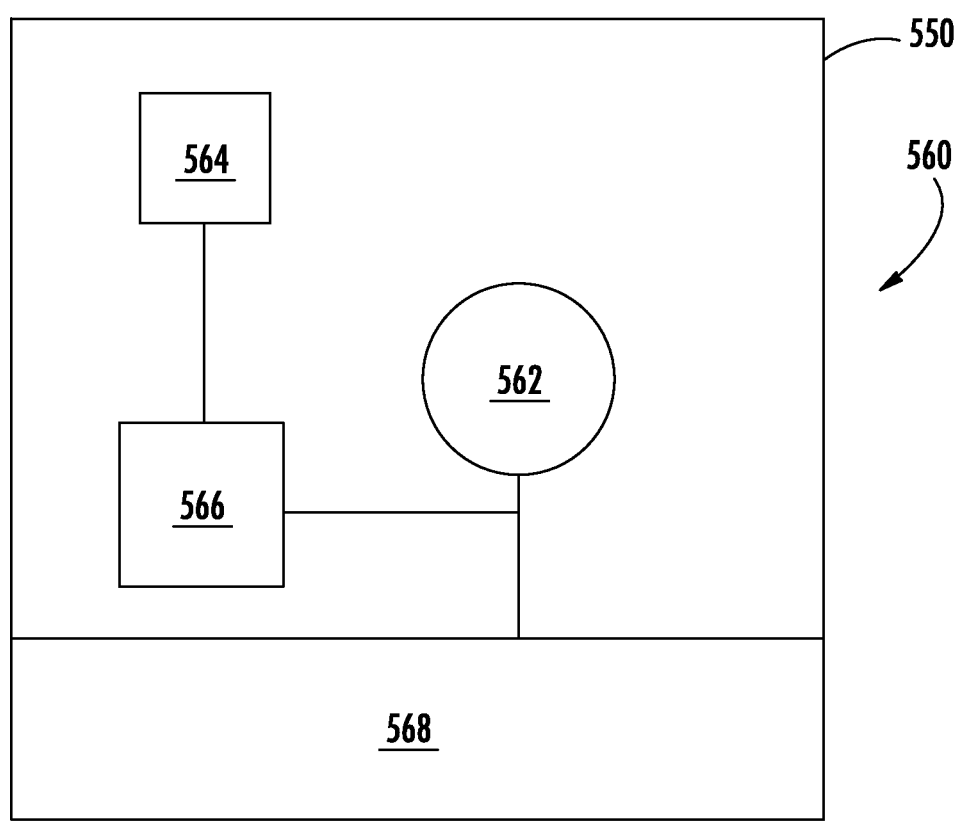
FIG. 5 is a schematic representation of an intermediate component comprising an MCU according to various embodiments described herein.
Figure 6:
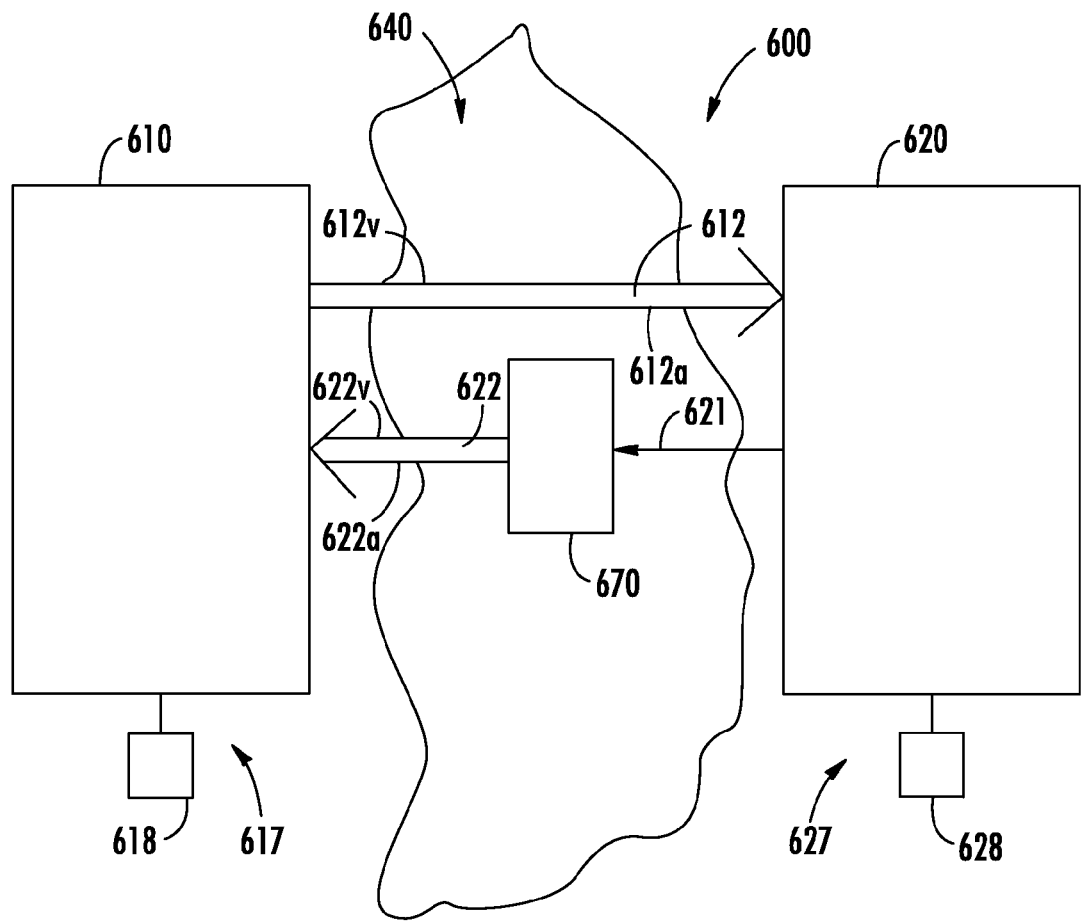
FIG. 6 is a schematic representation of a videoconference system for forking videoconference data streams according to various embodiments described herein.

FIG. 5 is a schematic of an intermediate component 560 comprising one or more servers according to various embodiments, which may be similar to intermediate components 360, 460. The intermediate component 560 comprises an MCU module 562 configured to provide MCU service, a data storage medium 564, and a logic control unit element 566, such as an electronic processor, configured to execute an MCU functionality program. The intermediate component 560 further comprises a gateway controller 568 configured to monitor videoconference data streams of mesh-based videoconferences, e.g., as shown in FIGS. 4A-4B. The gateway controller 568 may operatively associate with the logic control element 566 and data storage medium 564 to perform controller operations. The MCU service utilizes the gateway controller 568 for receiving, sampling, or determining videoconference data or parameters relative to the respective endpoint network capabilities from which threshold or switching may be determined. For example, in one embodiment, the data storage medium 566 is configured to store a file comprising instructions and rules with respect to endpoint or network capabilities or compatibilities, trigger event parameters, load capacities, tables or statistics with respect to data processing, manipulation, monitoring, bandwidth, latency, contention, encoding, compression, threshold optimization statistics, switching protocols, etc. for determining thresholds and switching optimization. The logical control element 566 may be configured to access the files in the data storage medium 566 to generate thresholds or levels. Thus, the MCU service or component thereof is configured to monitor the transmission of the videoconference data for threshold analysis and determination of trigger event parameters. The gateway controller 568 may be configured to control various MCU functions and endpoint access to an MCU module 562. In one embodiment, the gateway controller 568 monitors videoconference parameters such as number of participants, duration, participants having reduced or suppressed data, number videoconferences, MCU load, network capacities. The gateway controller 568 may access the storage medium 564 for instructions or rules executable by the logic control element 566, e.g., including a processor, for application of the rules to the monitored parameters or data generated therefrom. The gateway controller 568 may be configured to receive or approve requests for promotion of videoconference. In some instances, the gateway controller monitors videoconference parameters and applies the rules. For example, the gateway controller 568 may determine that the number of participants has exceeded a fixed or dynamic threshold of participants and thereafter promote the videoconference. The gateway controller 568 is thus configured to monitor mesh-based videoconferences and the endpoints for determination of switches. In preferred embodiments, the gateway controller 568 is not involved in processing the media data.

In various embodiments, the systems 300, 400 for FIGS. 3A-4B are configured to switch from mesh-based videoconferencing (FIGS. 3A and 4A) to MCU-based videoconferencing (FIGS. 3B and 4B). The system is configured to make a decision to switch from mesh-based videoconferencing to MCU-based videoconferencing upon the occurrence of a triggering event or associated parameter comprising a threshold related to the operation of the videoconference service, such as the MCU service or network capabilities of endpoints. For example, in one embodiment, the system 300, 400 is configured to switch from mesh-based videoconferencing to MCU-based videoconferencing upon a determination that a pre-determined, e.g., fixed, or dynamically determined number of participants for the service or network capabilities of one or more of the participants or endpoints, either with or without adaptive bitrate control in place, has been exceeded. In another embodiment, the system 300, 400 is configured to switch from mesh-based videoconferencing to MCU-based videoconferencing upon a determination that a number or proportion of the participants have exceeded network capabilities and have had their video resolution sent from and to their device reduced, e.g., adaptive bit rate control, or even suppressed, e.g., audio only, to maintain the overall experience for the majority of participants while minimizing the need for central MCUs.

In various embodiments, the trigger event may comprise at least one or both of a service event and a network capability of at least one participant of the videoconference. For example, in configurations where endpoints are configured to transmit and receive videoconference data directly from another endpoint without an intermediate component, such as a server, gateway, or other component configured to analyse or receive MCU service load data, such as FIGS. 3A and 3B, threshold trigger events may be fixed or predetermined such that MCU service load is not used, e.g., a service event may comprise exceeding a number of participants for the videoconference service. Thus, endpoints may be configured to exchange or monitor network capabilities. For example, the first endpoint may be configured to monitor network capabilities of the second endpoint, e.g., during adaptive bit rate control. In one embodiment, endpoints are configured to communicate with the MCU service to receive service load data. In one embodiment, an endpoint is configured to initiate a switch from mesh-based to MCU-based upon determination that network capabilities have been exceeding. The endpoint may send a request to the MCU to switch to MCU service. The MCU service may check the level of service associated with the videoconference to make a determination if the switch should be allowed. The determination may related to the MCU service load in relation to the service level. For example, if the service load is low, videoconferences with low level service may be allowed to switch to MCU-based service. However, if MCU service load in relation to the service level associated with the videoconference, which may be provided by the endpoint when the switch is requested, is high, the switch may not be allowed. Thus, whether requests to switch to MCU-based videoconferencing may depend on a current level of allowed services, such as low, medium, high, preferred, etc. Similarly, trigger events, trigger event parameters, or thresholds for the parameters may be defined by a current allowed level or range of allowed levels based on MCU service load.

In one embodiment, endpoints are configured to calculate or receive transmission statistics from other endpoints, which may be used to calculate parameters of trigger events for threshold determinations with respect to switching from mesh-based to MCU-based videoconference service. For example, a first endpoint may initiate a switch from mesh-based videoconferencing to MCU-based videoconferencing when the number of participants or endpoints exceeds a predetermined number. In some embodiments, the endpoint may be configured to initiate the switch from mesh-based videoconferencing to MCU-based videoconferencing based on a determination that the network capabilities of one of the first or second endpoints has been or is likely to be exceeded. In some embodiments, one or more of the endpoints are configured to monitor network capability parameters for determination of trigger event thresholds. In some embodiment, endpoints are configured to communicate with an MCU, e.g., a server, to obtain at least a portion of either identification of trigger events or parameters or one or more threshold criteria. The threshold criteria may be used to define thresholds for trigger event parameters. In one embodiment, the endpoint is configured to communicate the occurrence and determination that a trigger event parameter has reached a threshold. Initiation of the switch may comprise communication between the endpoints to initiate MCU-based videoconferencing or communication with the MCU to initiate MCU-based video conferencing with the endpoints.

As introduced above, according to various embodiments, the controls and limits are dynamically variable based on current load of the MCU service. For example the trigger event threshold level for switching may increase dynamically for one or more parameters based on the number of MCU conferences and participants in use so that as many conferences as possible are kept as mesh-based as the number of the MCU-based conferences increases in order to not exceed the finite capacity of the MCU. Alternatively, in some embodiments, the threshold limits for certain parameters may vary by service level, such as a preferred service level. Thus, the service level or type of service may be used to shape switching behaviour or determinations such as in relation to a service level, so that the quality of videoconference service is preserved for preferred or higher service levels over those with lower service level. Thus, an endpoint as shown in FIG. 3 may request threshold updates from the MCU service regarding dynamic thresholds related to the current load of the MCU.

In an arrangement where the MCU service monitors the mesh-based transmissions, environment, or capabilities of the participant networks, including endpoint capabilities/ compatibilities, as shown in FIG. 4, for example, the MCU service may perform dynamic calculations with respect to MCU service load and network capabilities to dynamically maintain thresholds to optimize videoconferencing performance based on load, network capabilities, or service level.

Thus, according to various embodiments, the videoconference system is configured to determine and initiate a switch from mesh-based videoconferencing to MCU-based videoconferencing based on rules such as MCU service load, endpoint capability or capacity, thereby ensuring that the move of underlying platforms is seamless and invisible to the user.

In one embodiment, the MCU comprises a single stand-alone unit. In another embodiment, the MCU or MCU functionalities may be distributed over multiple devices or locations. In one embodiment, an endpoint comprises or is configured to include MCU functionality. In a further embodiment, multiple endpoints may comprise or be configured to include MCU functionality wherein the respective MCU functionalities may cooperate or share operations, resources, bandwidth, etc., e.g, intelligently, to optimize performance within a variable and dynamic environment. In one embodiment, at least a portion of the MCU includes cloud-based operation.

To provide an optimal experience to users the switch from meshed to MCU conferencing is configured to be seamless. That is, in one embodiment use of MCU and central network elements is optimized such that the use of MCU-based videoconferencing only occurs when the number of participants reaches the threshold point. To achieve this, the endpoints are configured with intelligence built-in to switch from sending and receiving multiple streams to sending and receiving a single stream from and to the MCU. In these or other embodiments, the endpoints may also be configured to slice up the inbound video data stream to display in the same layout as the mesh-based videoconference. Therefore, the switch may appear seamless to participants. MCUs typically have a set number of layouts for display which needs to be mapped by each endpoint to the style used for the mesh conference.

In various embodiments, when switching from mesh-based to MCU-based videoconferencing, a central or intermediate component may comprise a signalling element configured to include metadata in a data stream wherein the metadata describes the layout of the video produced by the MCU. Alternatively, the endpoints may be configured to maintain the same layout despite the switch. Similarly, depending on the MCU configuration, the MCU may stream the same view to every participant or may stream a tailored view to each participant, such as removing the video from a participant from the video sent to that participant.

According to certain embodiments, a switch from mesh-based to MCU-based video conferencing requires that all participants switch. As the switch may be triggered by the network constraints of one or more participants, it is possible that some videoconference services may have a lower switch point forced on the service than is desired due to a low threshold associated with limited network capabilities of one or more participant endpoints. Accordingly, in one embodiment, referring to FIG. 6, a video conferencing system 600 comprises an intermediate component 670 that includes a media forking module that acts as an intelligent switch. In this embodiment, rather than have an endpoint 610 send a videoconference data stream 612 comprising an audio data stream 612a and a videoconference environment video data stream 612v to every other participant endpoint, as shown for endpoint 610, endpoint 620 is configured to send a single videoconference environment audio and video data stream 621 to the intermediate component 670 which then forks the media into a videoconference data stream 622 comprising a videoconference environment audio data stream 622a and a videoconference environment video data stream 622v that is sent to each of the other participants or endpoints 610. For brevity, only two endpoints are shown, however, the system 600 is configured such that additional endpoints may join the videoconference. Each participant still receives a videoconference environment audio data stream 612a, 622a and a videoconference environment video data stream 612v, 622v for each of the other participants, but, in this embodiment, the data stream 612, 622 may come from any combination of directly from endpoints or from the media forking module. Thus, as it is common for network connections, especially internet connections, to be asymmetric with significantly higher download capacity than upload rate. The videoconference system 600 comprising the intermediate component 670 that utilizes forking will allow participants with this asymmetric connections to participate in larger conferences without having to resort to using MCU-based videoconferences or reducing the switch point for the service. While this embodiment does require the use of a central resource, because the intermediate component comprising the media forking module acts as an intelligent multiplexing/multicasting switch that does not have to process the video it has significantly better scalability than an MCU. Consequently, the intermediate component 670 comprising the media forking module may enable an improved experience for each participant without the infrastructure investment that may be otherwise required through the use of an MCU alone.

In one embodiment, a videoconferencing system comprises a videoconferencing device configured for use as a first endpoint associated with one or more videoconference participants in a videoconference. The videoconferencing device may be configured to transmit first video data in a first video data stream and a first audio data in a first audio data stream for transmission to a second endpoint associated with one or more second participants of a videoconference. The videoconferencing device may be configured to receive a transmission of second video data in a second video data stream and second audio data in a second audio data stream transmitted from the second endpoint. Upon occurrence of a trigger event, the videoconferencing device may be configured to transmit the first video data and first audio data in a first single video/audio data stream to an MCU and receive a combined single video/audio data stream from the MCU. The combined single video/audio data stream comprises second video data and second audio data transmitted by the second endpoint to the MCU. The combined single video/audio data stream may further comprise combined video and audio data from additional or all conference participants. The MCU or a respective endpoint may further tailor video and/or audio data provided to particular participants or participant communication devices to customize or optimize presentation of the conferencing data.

It is to be appreciated that the various embodiments described here may be used with any suitable signalling protocol to control how participants join conferences and interact with other participants. Among suitable protocols are WebRTC, SIP & H.323.

It is to be further appreciated that in addition to mesh videoconferencing or full mesh videoconferencing where each participant or endpoint sends videoconference data streams to all other participants or endpoints the principles and approach described here are equally applicable to peer-to-peer networking strategies including small-world networks. In various embodiments, an MCU service comprising an MCU may allow for streaming video from the current active speaker or nominated speaker. While the intent with mesh conferences is to show video from multiple sources the approaches outlined in this proposal can be effectively applied to active speaker or one or more nominated speaker display schemes.

The foregoing description of the various exemplary embodiments is provided to enable any person skilled in the art to make and use the present invention and its embodiments. Various modifications to these embodiments are possible, and the generic principles presented herein may be applied to other embodiments as well.

In various embodiments, the herein described systems and methods may be implemented in software, firmware, or executable instructions stored in a data storage medium such as or including machine-readable medium. The term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure. Some embodiments may be implemented using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. Computers and computer systems described herein may include operatively associated computer-readable memory media such as memory for storing software applications and instructions used in obtaining, processing, storing or communicating data. It can be appreciated that such memory can be internal, external, remote or local with respect to its operatively associated computer or computer system. Memory may also include any means for storing software or other instructions including, for example and without limitation, a hard disk, an optical disk, floppy disk, DVD, compact disc, memory stick, ROM (read only memory), RAM (random access memory), PROM (programmable ROM), EEPROM (extended erasable PROM), or other like computer-readable media. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, various types of Digital Versatile Disk (DVD), a tape, a cassette, or the like.

It will be further apparent to one of ordinary skill in the art that some of the embodiments as described hereinabove may be implemented in many different embodiments of instruction (e.g., software or firmware) and hardware. The instructions may include any suitable type of code, such as source code, compiled code, interpreted code, executable code, static code, dynamic code, and the like. The actual software code or specialized control hardware used to implement some of the illustrated embodiments do not limit the present invention. The instructions may be implemented, for example, using any suitable programming language, which may include high-level, low-level, object-oriented, visual, compiled or interpreted programming languages, such as, but not limited to, C, C++, Java, BASIC, SQL, Perl, Matlab, Pascal, Visual BASIC, assembly language, machine code, and so forth. The embodiments are not limited in this context.

What is claimed is:

1. A method of conferencing participant video data and audio data among a plurality of endpoints, the method comprising: transmitting from a first endpoint to at least a second endpoint in a mesh-based conference a first video data stream comprising first participant video data and a first audio data stream comprising first participant audio data; receiving at the first endpoint in the mesh-based conference at least a second video data stream comprising second participant video data transmitted by the second endpoint and at least a second audio data stream comprising second participant audio data transmitted by the second endpoint; and switching, upon the occurrence of a trigger event, from the mesh-based conference to an MCU-based conference comprising transmitting from the first endpoint to an MCU a single video/audio data stream comprising first participant video data and first participant audio data, and receiving at the first endpoint from the MCU a combined single video/audio data stream comprising second participant video data and second participant audio data; wherein the trigger event comprises a conferencing service event associated with an MCU conferencing service serving the conference; wherein the conferencing service event comprises a dynamically based threshold number of MCU conferences and participants being served by the MCU conferencing service, and wherein the threshold number is configured to maximize the number of mesh-based conferences or mesh-based conference participants conferencing without reduced or suppressed video data as to not exceed a finite capacity of the MCU.

2. The method of claim 1, wherein the conferencing service event comprises exceeding a fixed number of participants being served by the MCU.

3. The method of claim 1, wherein the conferencing service event comprises a dynamically variable threshold level, wherein the threshold level is based on a current processing load of the MCU.

4. The method of claim 1, wherein the trigger event comprises exceeding a network capability of the first endpoint, the second endpoint, or a predefined proportion of endpoints conferenced with the first and second endpoints.

5. The method of claim 1, wherein the trigger event comprises exceeding a network capability of the first endpoint or the second endpoint with or without adaptive bit rate control.

6. The method of claim 1, wherein the trigger event comprises exceeding a predefined proportion of participants that have had video data reduced or suppressed.

7. The method of claim 1, wherein the occurrence of the trigger event is determined by an intermediate component associated with the MCU, and wherein the intermediate component is configured to monitor network capabilities of at least the first endpoint during mesh-based conferencing.

8. The method of claim 1, further comprising slicing up video data received by the first endpoint in the combined single video/audio data stream to display the second participant video data in a video layout during the MCU-based conference that corresponds to a video layout displayed during the mesh-based conference prior to switching.

9. The method of claim 1, wherein the first endpoint is configured to receive metadata describing a video layout produced by the MCU in the combined single video/audio data stream.

10. The method of claim 1, wherein the first endpoint is configured with metadata resources describing a video layout produced by the MCU to display the second participant video data received from the MCU in the video layout produced by the MCU.

11. A videoconferencing system for conferencing a plurality of conference endpoints, the system comprising: a first endpoint configured to conference one or more first endpoint participants with one or more second endpoint participants associated with at least one second endpoint, wherein the first endpoint is configured to switch the conference from a mesh-based conference to an MCU-based conference upon the occurrence of a trigger event, wherein in the mesh-based conference the first endpoint is configured to transmit first participant video data in a first video data stream and first participant audio data in a first audio data stream, and receive second participant video data and second participant audio data in separate video and audio data streams transmitted from the at least one second endpoint, and wherein in the MCU-based conference the first endpoint is configured to transmit first participant video data and first participant audio data in a single video/audio stream to an MCU, and receive a combined single video/audio data stream from the MCU comprising second participant video data and second participant audio data transmitted to the MCU by the at least one second endpoint; wherein the trigger event comprises a conferencing service event associated with an MCU conferencing service serving the conference; wherein the conferencing service event comprises a dynamically based threshold number of MCU conferences and participants being served by the MCU conferencing service, and wherein the threshold number is configured to maximize the number of mesh-based conferences or mesh-based conference participants conferencing without reduced or suppressed video data as to not exceed a finite capacity of the MCU.

12. The system of claim 11, wherein the conferencing service event comprises exceeding a fixed number of participants being served by the MCU.

13. The system of claim 11, wherein the conferencing service event comprises a dynamically variable threshold level based on a current processing load on the MCU.

14. The system of claim 11, wherein the trigger event comprises exceeding a network capability of the first endpoint, the at least one second endpoint, or a predefined proportion of the first endpoint and the at least one second endpoint.

15. The system of claim 11, wherein the trigger event comprises exceeding a network capability of the first endpoint or the at least one second endpoint with or without adaptive bit rate control.

16. The system of claim 11, wherein the trigger event comprises exceeding a predefined proportion of participants that have had video data reduced or suppressed.

17. The system of claim 11, wherein the occurrence of the trigger event is determined by an intermediate component associated with the MCU, and wherein the intermediate component is configured to monitor network capabilities of at least the first endpoint during mesh-based conferencing.

18. The system of claim 11, wherein the MCU is configured to stream a same video view to the first endpoint and the at least one second endpoint.

19. The system of claim 11, wherein the MCU is configured to remove or exclude the first endpoint participant video data from the combined single video/audio data stream before the combined single video/audio data stream is transmitted to the first endpoint.

20. The system of claim 19, wherein the first endpoint is configured to remove or excludes the first endpoint participant video data from the combined single video/audio data stream received from the MCU before providing the second participant video and audio data to the first participant.

* * * * *